(12) United States Patent
Bläse et al.

(10) Patent No.: US 7,029,584 B2
(45) Date of Patent: Apr. 18, 2006

(54) ROTATING FILTER

(75) Inventors: Dieter Bläse, Mutlangen (DE); Hans Olapinski, Aichwald (DE); Hans-Peter Feuerpeil, Schwäbisch, Gmünd (DE)

(73) Assignee: aaflowsystems GmbH & Co. KG, Essingen (DE)

( * ) Notice: Subject to any disclaimer, the term of this patent is extended or adjusted under 35 U.S.C. 154(b) by 0 days.

(21) Appl. No.: 10/332,756

(22) PCT Filed: Jul. 3, 2001

(86) PCT No.: PCT/EP01/07588

§ 371 (c)(1),
(2), (4) Date: Feb. 24, 2003

(87) PCT Pub. No.: WO02/05935

PCT Pub. Date: Jan. 24, 2002

(65) Prior Publication Data

US 2003/0183586 A1 Oct. 2, 2003

(30) Foreign Application Priority Data

Jul. 13, 2000 (DE) .............................. 100 34 055
Jan. 17, 2001 (DE) .............................. 101 01 846

(51) Int. Cl.
*B01D 33/23* (2006.01)
(52) U.S. Cl. ..................... 210/331; 210/398; 210/406
(58) Field of Classification Search ............... 210/175, 210/184, 252, 253, 321.63, 321.68, 324, 210/330, 331, 337, 359, 398, 402, 406
See application file for complete search history.

(56) References Cited

U.S. PATENT DOCUMENTS

| 807,228 | A | * | 12/1905 | Wurster | 241/296 |
| 1,264,635 | A | * | 4/1918 | Graham | 210/331 |
| 1,532,649 | A | * | 4/1925 | Bieber | 241/251 |
| 3,466,241 | A | * | 9/1969 | Simpson | 210/619 |
| 3,516,929 | A | * | 6/1970 | Welch | 210/619 |
| 3,674,440 | A | * | 7/1972 | Kitrilakis | 422/48 |
| 3,849,304 | A | * | 11/1974 | Torpey et al. | 210/619 |
| 3,932,273 | A | * | 1/1976 | Torpey et al. | 210/619 |
| 3,997,443 | A | * | 12/1976 | Thissen | 210/150 |
| 4,269,719 | A | * | 5/1981 | Yamamoto | 210/803 |
| 4,321,140 | A | * | 3/1982 | Luthi | 210/327 |
| 4,360,429 | A | * | 11/1982 | Morris | 210/242.3 |
| 4,655,406 | A | * | 4/1987 | Eriksson | 241/261 |
| 4,728,424 | A | * | 3/1988 | Miura | 210/331 |
| 4,732,336 | A | * | 3/1988 | Eriksson | 241/261 |

(Continued)

FOREIGN PATENT DOCUMENTS

DE    10023292 C1 *  8/2001

(Continued)

*Primary Examiner*—Robert James Popovics
(74) *Attorney, Agent, or Firm*—Baker & Daniels

(57) ABSTRACT

A device for filtering liquids comprising two shafts which are parallel to each other or at an acute angle wherein each shaft carries a stack of disks that extend perpendicularly to the shaft axis and are rotated thereby. The disks of one stack are engaged in the intermediate spaces of an adjacent disk stack and at least one of the shafts is driven. At least one of the shafts is hollow and is provided with bores and some of the disks have channels therein which are fluidly connected to the inside of their respect hollow shaft. A support ring is oversized in relation to the shaft so that a channel is formed between the inner surface of the support ring and the outer surface of the shaft and this channel extends over at least part of the length of the shaft.

23 Claims, 11 Drawing Sheets

U.S. PATENT DOCUMENTS

| | | | |
|---|---|---|---|
| 4,876,007 A * | 10/1989 | Naruo et al. | 210/339 |
| 4,936,986 A * | 6/1990 | Tarves, Jr. | 210/321.64 |
| 6,461,503 B1 * | 10/2002 | Blase et al. | 210/194 |
| 6,558,545 B1 * | 5/2003 | Blase et al. | 210/321.69 |
| 6,596,164 B1 * | 7/2003 | Oonishi et al. | 210/321.67 |
| 6,627,080 B1 * | 9/2003 | Oonishi et al. | 210/321.67 |
| 6,808,634 B1 * | 10/2004 | Zegg | 210/650 |
| 2003/0150794 A1 * | 8/2003 | Blase et al. | 210/498 |
| 2003/0183586 A1 * | 10/2003 | Blase et al. | 210/784 |
| 2004/0159603 A1 * | 8/2004 | Boulnois et al. | 210/331 |
| 2004/0195166 A1 * | 10/2004 | Gabl | 210/331 |

FOREIGN PATENT DOCUMENTS

| | | | |
|---|---|---|---|
| DE | 10019671 A1 * | 10/2001 | |
| DE | 10019672 A1 * | 10/2001 | |
| DE | 10019674 A1 * | 10/2001 | |
| DE | 10039272 C1 * | 1/2002 | |
| DE | 10104812 A1 * | 8/2002 | |
| DE | 10239247 C1 * | 12/2003 | |
| EP | 1374967 A1 * | 1/2004 | |
| JP | 61/200808 | 9/1986 | |
| JP | 62-213811 | 9/1987 | |
| JP | 02102717 A * | 4/1990 | |
| JP | 07-75722 | 3/1995 | |
| JP | 08-309160 | 11/1996 | |
| WO | WO 98/09720 | 3/1998 | |
| WO | WO 2098547 A2 * | 12/2002 | |
| WO | WO 2004018083 A1 * | 3/2004 | |

* cited by examiner

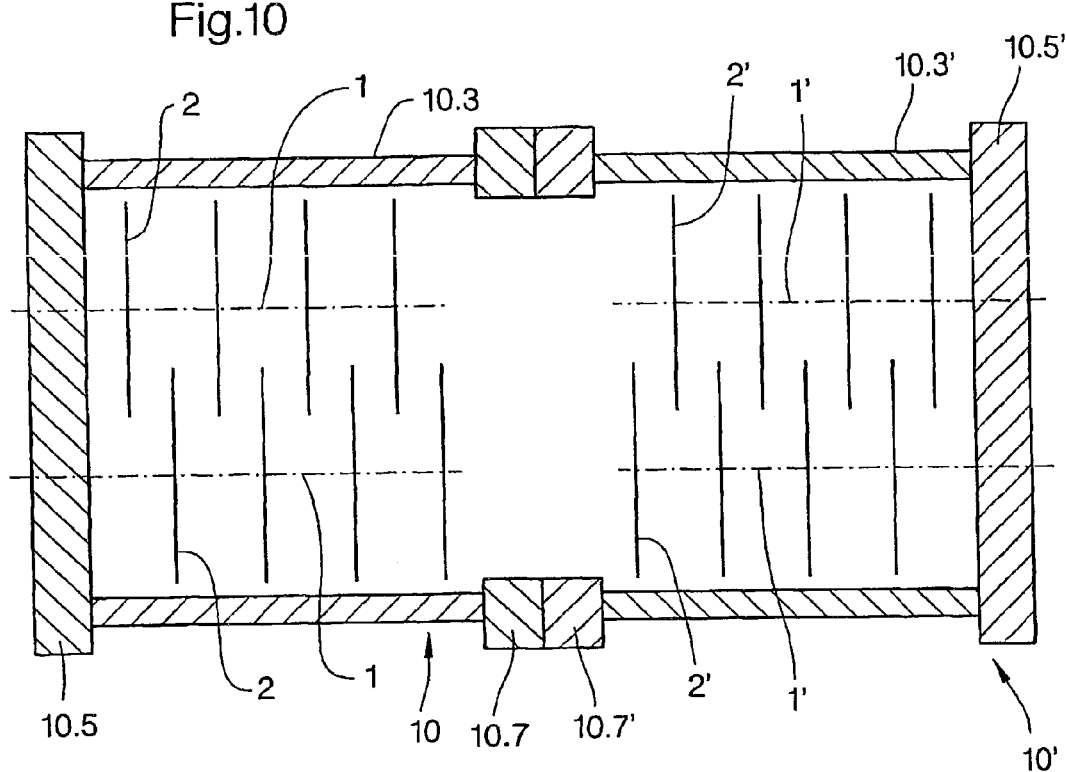
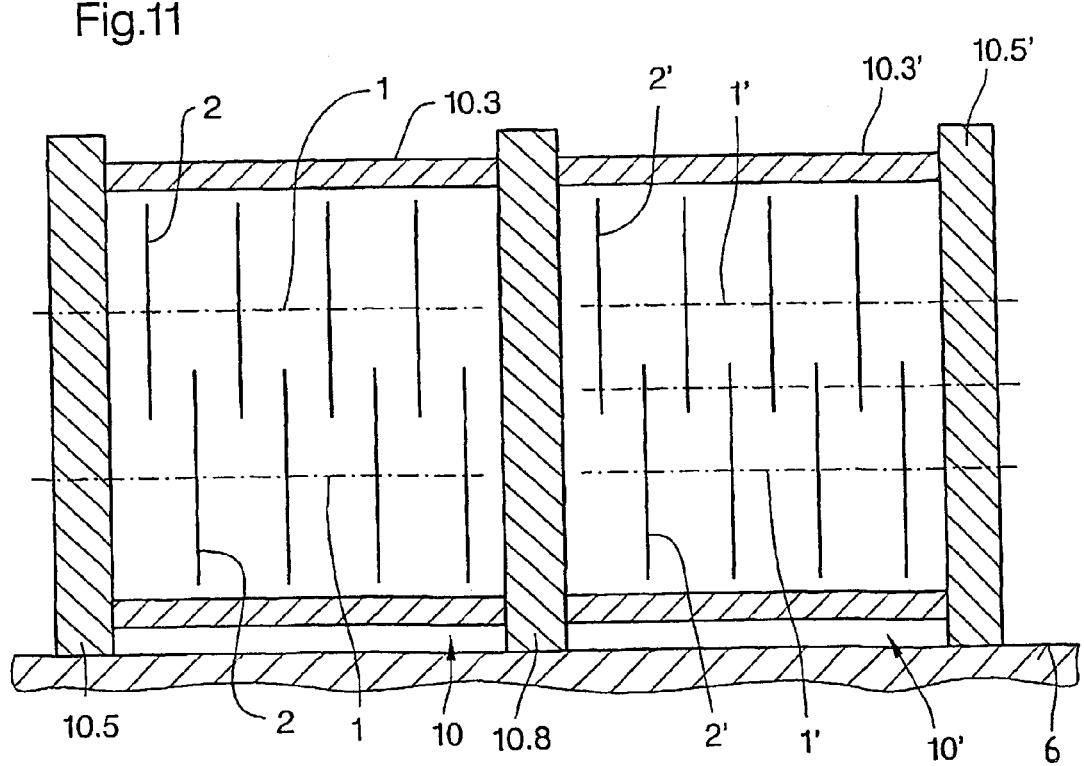

ROTATING FILTER

BACKGROUND OF THE INVENTION

The invention relates to a device for filtering liquids. Such a device is described for example in DE 100 19 672 A1.

Devices of this kind serve the cross-flow permeation of free-flowing media. They contain at least two shafts, onto which in each case many disk-shaped diaphragm bodies are arranged parallel to each other and in mutual distance. The shafts are hollow, and the diaphragm disks are made of ceramic material and are burred with radial channels. Between the radial channels and the inside of the hollow shaft is a conducting connection. The liquid to be filtered arrives from the outside through the porous material of the diaphragm body into the channels, and from there into the hollow shaft.

The shafts mentioned run parallel to each other, so that also the diaphragm disks of two each other adjacent disk stacks are arranged parallel to each other. The shafts are arranged so close next to each other in such a manner that the disks of two disk stacks interlockingly engage.

The disks do not have to have the mentioned design using porous ceramic material. There are also applications in which some disks are built up as so-called dummy disks. It is also possible to make the disks from strainer bodies. Also combinations of the designs mentioned are conceivable, for example the combination of strainer body-diaphragm body. In the following description only the term "disks" is used.

In order to achieve as great a productivity as possible, as many disks as possible are to be positioned on a shaft. The disks therefore must be arranged as close as possible. On the other hand however it must be made certain that the disks of one stack do not touch the disks of the other stack. Therefore an accurate axial positioning of the disks on their shafts is required.

For the purpose of positioning, distancing elements are arranged between adjacent disks. Also for the purpose of an accurate axial positioning the total disk stack is compressed, for example by a nut, which is screwed onto the hollow shaft on one of its ends, and which exerts a suitable pressure on the multiplicity of disks with the distancing elements present between them. A spring assembly can be mounted between the nut and hollow shaft.

Furthermore it must be ensured that the disks are positioned perfectly also in the radial direction, and that with the rotation of the shaft with the disks present on it concentricity is ensured and radial deflecting is avoided. Furthermore it must be ensured that the torque is transferred from the rotating hollow shaft equally onto all disks of the hollow shaft.

Finally a perfect seal between the disks and the distancing elements must be provided, so that no liquid passes through between the disks and the distancing elements to the hollow shaft.

All these requirements could not be fulfilled to the desired extent with the well-known devices.

SUMMARY OF THE INVENTION

It is the task of the invention to develop a device of the initially described kind in such a manner that a perfect axial and radial positioning of the disks results, that the impermeability against passing of liquid between the disks and the distancing elements is ensured, that the torque is transferred equally to all disks, and that the whole device with all its many component parts can be easily and reliably assembled.

The central idea of the invention consists in the design of the distancing element. Said distancing element contains one support ring as well as two sealing rings.

The support ring is dimensioned in such a manner that it is oversized in relation to the hollow shaft. Between the lateral surface of the hollow shaft and the inner surface of the support ring thus a ring-shaped gap area is present. This gap area extends over the total length of the hollow shaft. It can be dimensioned amply, so that a free current is possible and deposits are avoided. This is for example of great importance for applications in the pharmaceutical industry.

For the purpose of positioning the support ring exhibits projecting parts, which are supported by the lateral surface of the hollow shaft. The projecting parts can taper—when viewed in a cross-section perpendicular to the axis—towards the lateral surface, so that between projecting part and lateral surface of the hollow shaft only line contact prevails.

In addition a device is provided to create a rotationally fixed connection between the hollow shaft and support ring. Due to the tight restraint between the support rings, the sealing components and the disks, the disks are carried forward by the distancing elements through friction.

One of the projecting parts mentioned can engage in a suitable recess of the hollow shaft parallel to the axis, creating a rotationally fixed connection.

The sealing rings mentioned are located on the two faces of each support ring. They create the desired sealing connection as well as the necessary torque transmission between support ring and disk.

BRIEF DESCRIPTION OF THE DRAWINGS

The invention is described in more detail with the drawings. The following is detailed represented:

FIG. 10 shows a design example of the invention with a twin arrangement of two devices according to the invention.

FIG. 11 shows a design example of the invention, again with a twin arrangement of two devices, however with a partition wall present between them.

DETAILED DESCRIPTION

Figure 1:
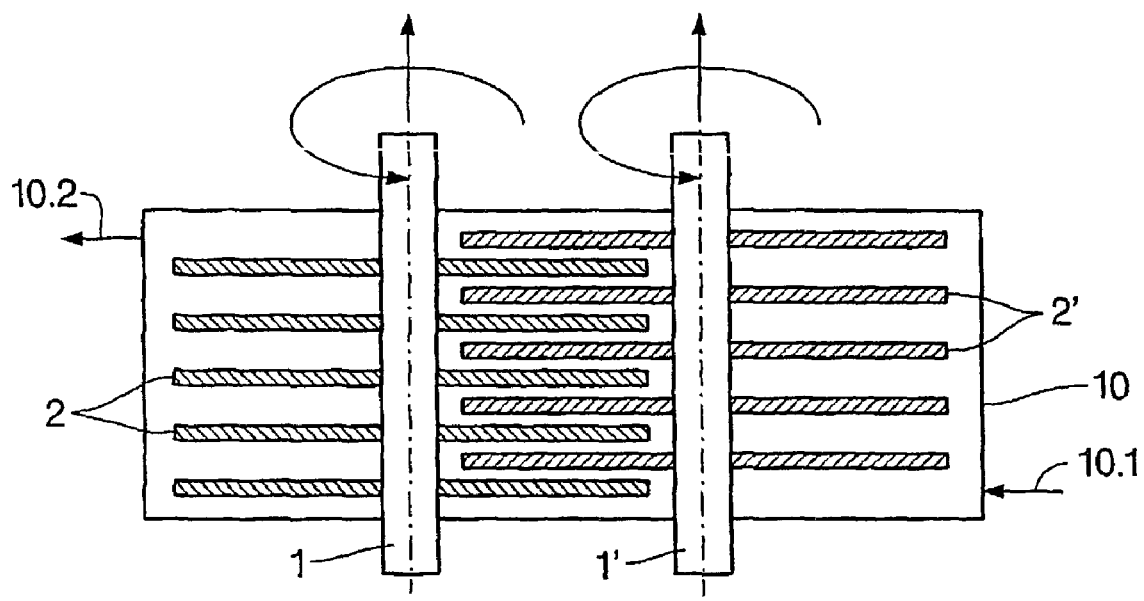
FIG. 1 shows a device with filter plates according to the invention in a diagrammatic front view.
Figure 2:
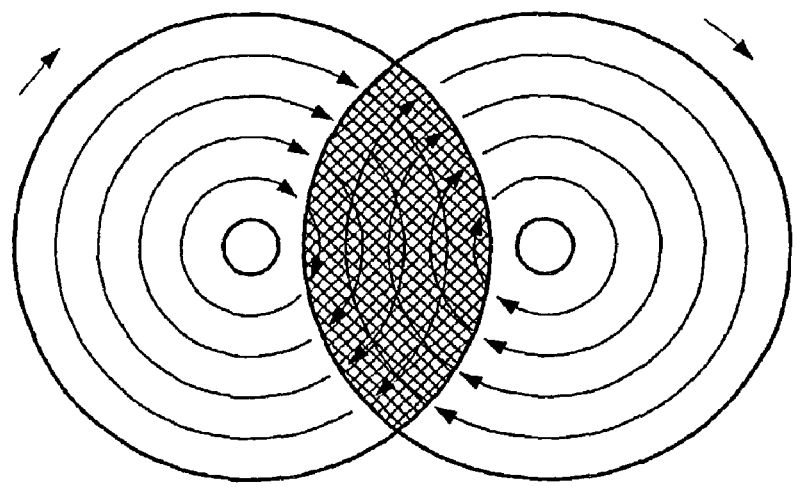
FIG. 2 shows the subject of FIG. 1 in a top view.

As can be seen in FIGS. 1 and 2, the device comprises two hollow shafts 1, 1'. Each hollow shaft carries a stack of disks 2, 2'. The two shafts 1, 1' and the disk stacks are in a reservoir 10. The reservoir includes an inlet 10.1 and an outlet 10.2.

The two hollow shafts 1, 1' are driven—see FIG. 2, seen in top view on the ends of the shafts in the counterclockwise direction. They can run also in the clockwise direction. The rotation in the same direction of rotation is preferred.

In the present case the disks 2 and 2' serve the purpose of filtration. They are composed of a porous ceramic material and exhibit internal channels. The channels are in conducting connection with the insides of the hollow shafts 1, 1'.

The medium to be treated arrives in the inside of the reservoir 10 through the inlet 10.1. The filtrate/permeate enters then through the pores of the ceramic material the channels mentioned and arrives from there in the inside of the two hollow shafts 1, 1'. It emerges then at the upper ends of the hollow shafts—see the two arrows pointing upward.

Whatever amount is not able to penetrate through the pores of the ceramic material, arrives as residue at the outlet 10.2 of the reservoir 10.

Figure 3:
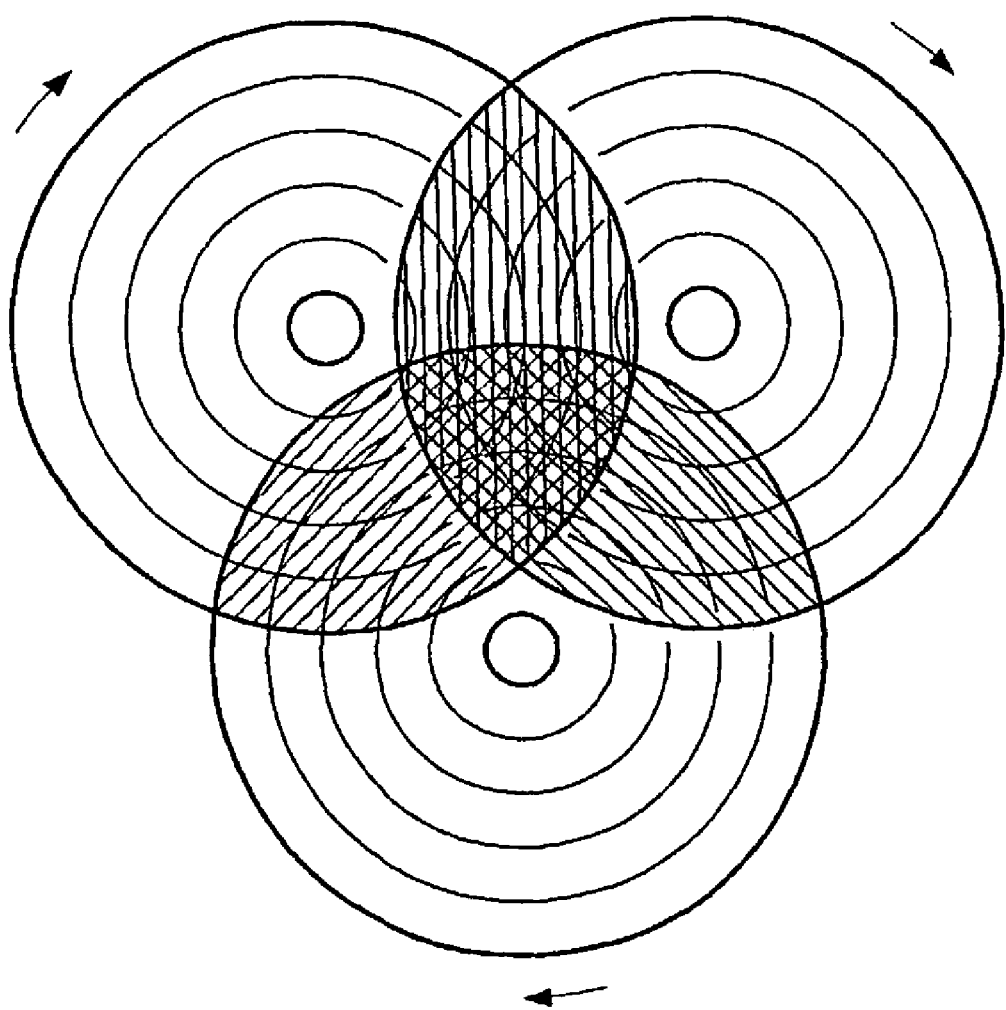
FIG. 3 shows a modified design example of the subject of FIG. 1, again in a top view.

In the design example shown in FIG. 3 three shafts with three disk stacks are represented. The disks run here in the same direction of rotation as well. In addition, a direction of rotation moving in opposite directions could be selected.

Figure 4:
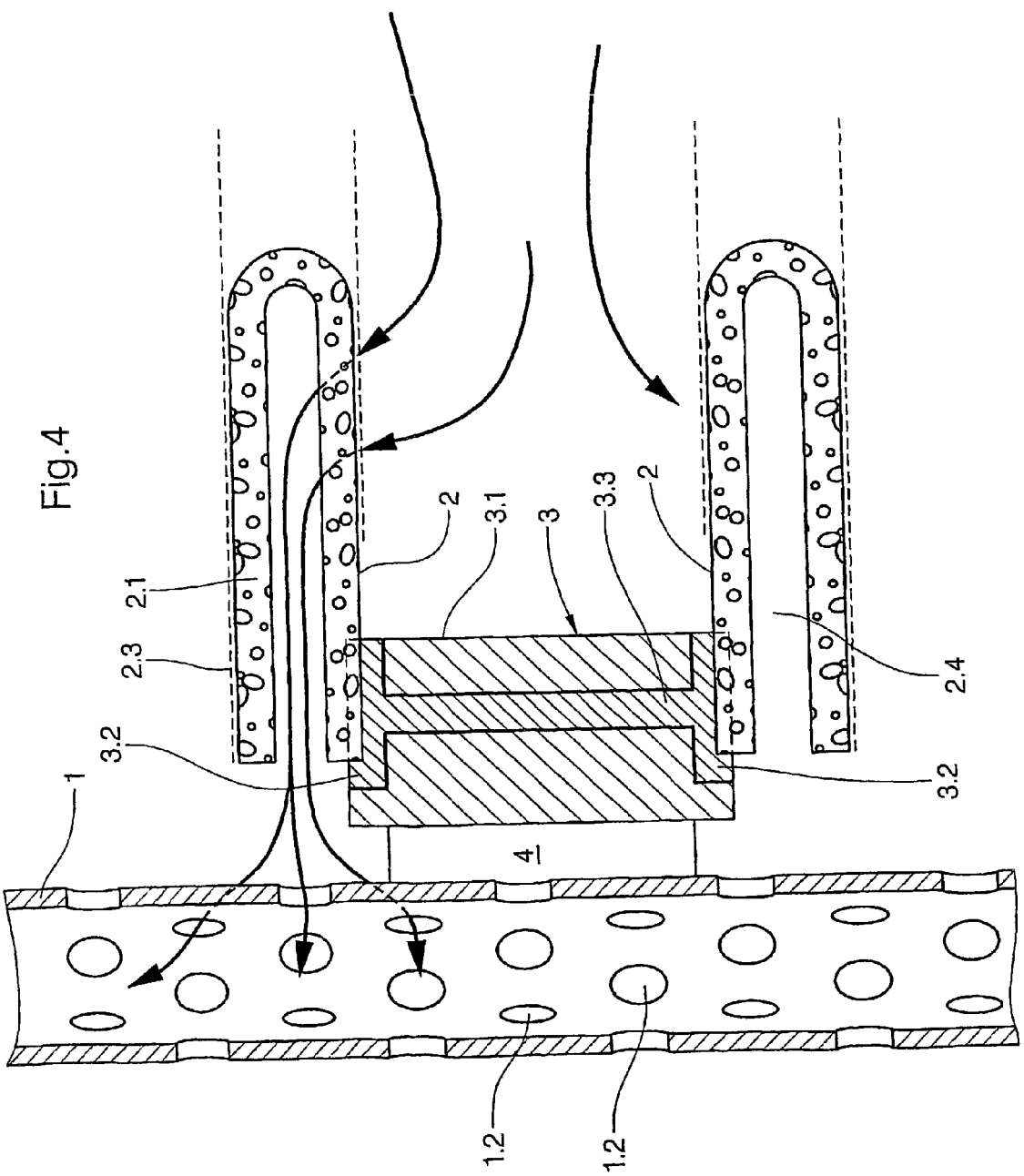
FIG. 4 shows a section of the subject of FIG. 1.

FIG. 4 shows substantial details of the invention. One recognizes again a hollow shaft 1, furthermore in cross section two diaphragm disks 2, which are designed identically. The diaphragm disks contain in each case a supporting body 2.1 made from porous, ceramic material. Furthermore they contain a diaphragm coating 2.3, which is carried by the supporting body and is located at its external surface.

The distancing element 3 is crucial. It is ring-shaped. It encloses the hollow shaft 1.

The distancing element 3 includes a support ring 3.1 as well as two sealing rings 3.2, 3.2.

Figure 5:
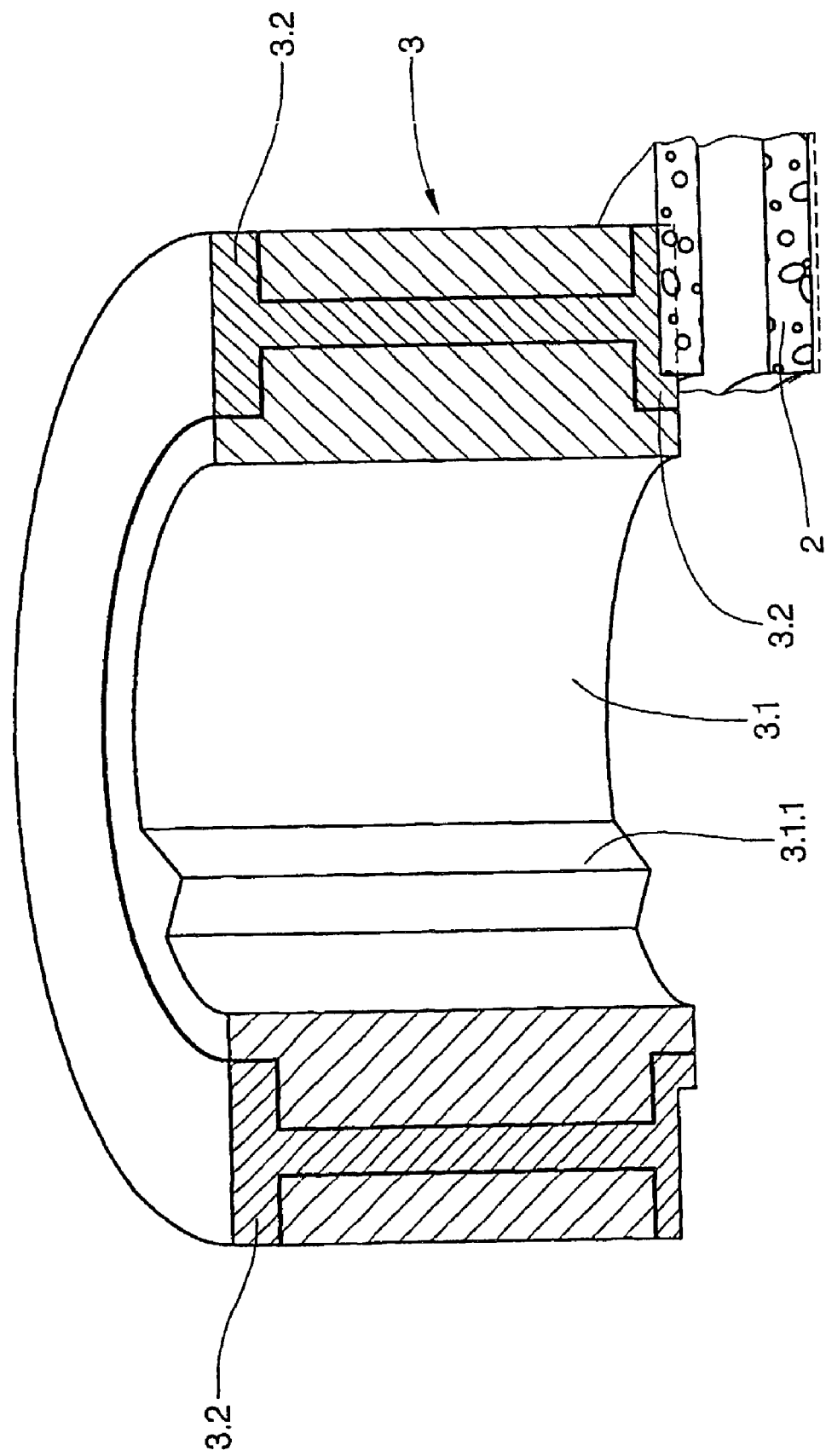
FIG. 5 shows an enlarged view of a ring half of the distancing element shown in FIG. 4.
Figure 6:
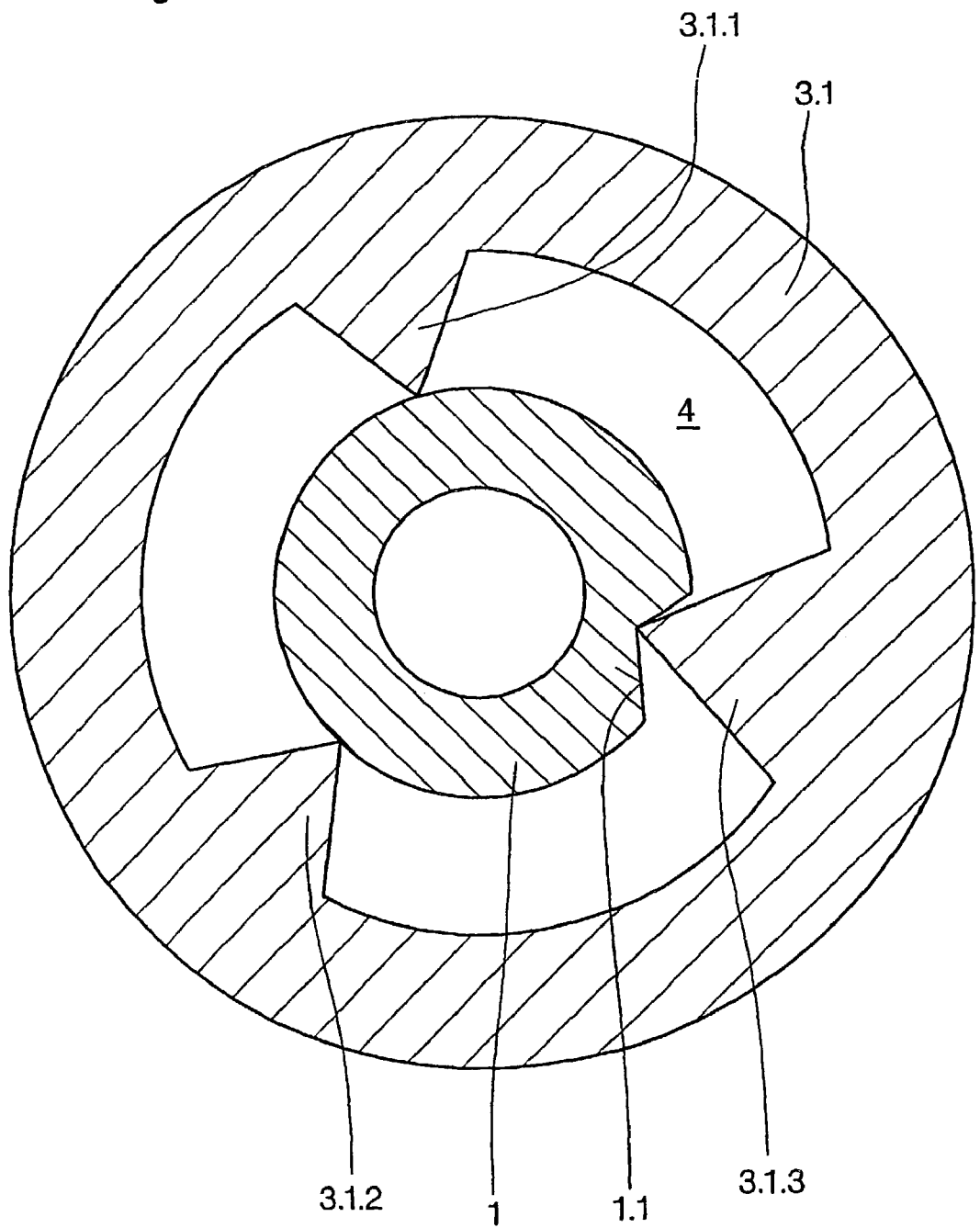
FIG. 6 shows a cut through the subject of FIG. 4, said cut made in the area of the distancing element, diagrammatic in an enlarged view.

The shape of the distancing element 3 can be seen more accurately in FIGS. 5 and 6.

The support ring 3.1 is oversized in relation to the hollow shaft 1. Its internal circumferential area has a larger radius than the lateral surface of the hollow shaft 1. For this reason a ring-shaped gap 4 is formed between these two areas—see FIG. 4.

Support ring 3.1 exhibits a peculiarity. As can be seen in FIGS. 4, 5 and 6, it is provided with projecting parts. The projecting parts 3.1.1 and 3.1.2 are of identical design, while projecting part 3.1.3 is different. All three projecting parts are wedge-shaped or triangular in the sectional view according to FIG. 6. They exhibit a point, which is directed towards the hollow shaft 1. But the points of the projecting parts 3.1.1 and 3.1.2 support themselves on the lateral surface of the hollow shaft 1, while the projecting part 3.1.3 engages in a groove 1.1 of the hollow shaft 1. Projecting part 3.1.3 and groove 1.1 create a rotationally fixed connection between hollow shaft 1 on the one hand and support ring 3.1 on the other hand, therefore at the same time between hollow shaft 1 and the stack of the disks 2.

The ring-shaped gap 4 between the support ring 3.1 and the hollow shaft 1 can again be seen in FIG. 6. This ring-shaped area 4 is interrupted in circumferential direction only by the projecting parts 3.1.1, 3.1.2 and 3.1.3, and extends however over the total length of the hollow shaft 1.

As can be seen in FIG. 4, each disk 2 exhibits in its inside an interior channel 2.4—here shown largely exaggerated. Channel 2.4 of each disk 2 is with the ring-shaped gap 4 and the inside of the hollow shaft 1 in conducting connection by means of bores 1.2, which extend over the total length of the hollow shaft 1. The gap 4 can be dimensioned amply, so that free current of the medium and thus good rinsing are possible, without the danger of deposits caused by dead corners.

The dimensioning of projecting part 3.1.3 and groove 1.1, represented in FIG. 6, can also be helpful. The groove 1.1 has a larger opening angle than the angle of the projection part 3.1.3 at its point. Thus a certain flow takes place also within the area of the point of the projecting part 3.1.3.

The projecting parts 3.1.1, 3.1.2 and 3.1.3 cause a centering of the support ring 3.1 on the hollow shaft 1 and position thereby at the same time the disks 2 of the total disk stack, which results from the following.

The distancing element carries the two mentioned sealing rings 3.2 on its two faces. In the present case these two sealing rings are connected by a bar 3.3. The sealing rings 3.2 and the bar 3.3 are one-piece. The bar has thereby no functional meaning, but is suitable for production reasons. It could also be positioned radially further outside, in such a manner that the two sealing rings 3.2, 3.2 form together with the bar 3.3 in the representation according to FIG. 4 a U-shaped profile.

The perspective representation of the distancing element 3 according to FIG. 5 shows the following:

In the left-hand end of the figure the sealing ring 3.2 can be seen in a condition, in which it is fastened to the support ring 3.1 by vulcanizing, however without being machined. In the right-hand side the two sealing rings 3.2, 3.2 are machined and a seat is formed, which is rectangular in this representation. The purpose of this seat is to receive the disk 2. The accurate seat can be formed directly during the vulcanization. The seat face can be profiled, for example in a wave shape or saw tooth shape.

The total disk stack including the multiplicity of distancing elements 3 present between them is restrained evenly in axial direction during assembly. An axial pressure is exerted, so that the components mentioned are pressed together. This can be achieved for example by screwing a nut onto one end of the hollow shaft 1; here the nut exercises an axial load on the distancing element 3 when it is tightened. The contact pressure is passed symmetrical and without friction losses to all other disks 2 and distancing elements 3.

The special design according to the invention of the carrying component 3 enables the distancing elements 3 to slide in axial direction basically frictionless on the lateral surface of the hollow shaft 1 when restrained as mentioned. Thereby a pressure drop of the clamping force over the length of the hollow shaft 1 is avoided.

The clamping force is necessary in order to transfer the torque that is transferred by the shaft 1 to the support ring 3.1 also to the disks 2. A frictional connection between the disks 2 and the sealing rings 3.2 is created by the restraint mentioned, so that when the hollow shaft 1 is turned all disks are taken along.

The following benefit, which results from the invention, is especially important: The axial clamping of the disks 2 and the distancing elements 3 leads to an accurate positioning of the disks 2 in axial direction. It is important that in an arrangement according to the FIGS. 1 to 3 mutual contact of the disks of one stack with the disks of an adjacent stack is avoided. If a pressure drop over the length of the hollow shaft 1 would occur, caused by friction between gasket and hollow shaft, then the disks and distancing elements would be in the upper area impinged with pressure to a higher extent, i.e., where the axial clamping force is initiated, than disks and distancing elements in a more distant area. Thereby axial deviations in the dimension would occur, which add on to themselves.

The material of the support rings 3.1 should be a relatively hard, to a large extent incompressible material, for example high-grade steel, in special cases titanium, ceramic(s), carbon, synthetic, e.g. enforced.

As materials for the sealing rings ductile and/or elastic ductile materials come into consideration, e.g. elastomers, easily ductile metals and/or their alloys as well as graphite.

An important point is the problem of the expansion of the whole unit during a temperature rise. The hollow shaft 1 will generally be made of high-grade steel. Its thermal expansion can be easily determined.

Figure 7:
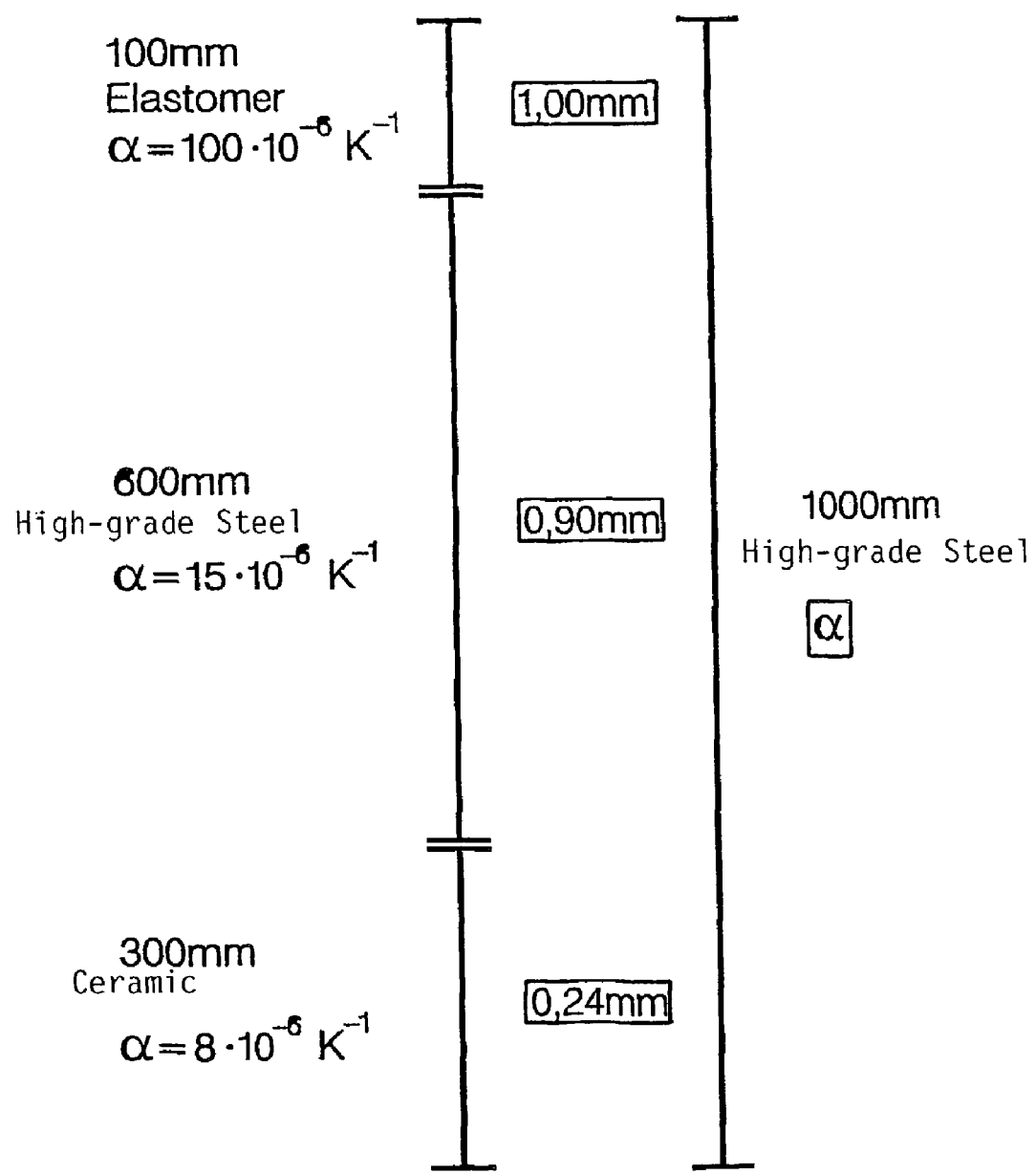
FIG. 7 pictorializes parallel next to each other on the one hand the length of the hollow shaft, on the other hand the added lengths of the disks, the support rings as well as the sealing rings.

The thermal expansion of the hollow shaft is to be compared to the thermal expansion of its surrounding components, i.e. the disks 2 consisting of ceramic(s) or the like, the carrying components 3.1 and the sealing rings 3.2. Hereby it is desirable or necessary that these two components—hollow shaft on the one hand and disks, carrying components, sealing rings on the other hand—show the same thermal expansion behavior. This is usually not the case. Therefore according to a further thought of the invention it is recommended to select concerning the materials of the three components last mentioned—disks, support rings, sealing rings—materials that lead to the desired result when interconnected. See for this FIG. 7.

Figure 8:
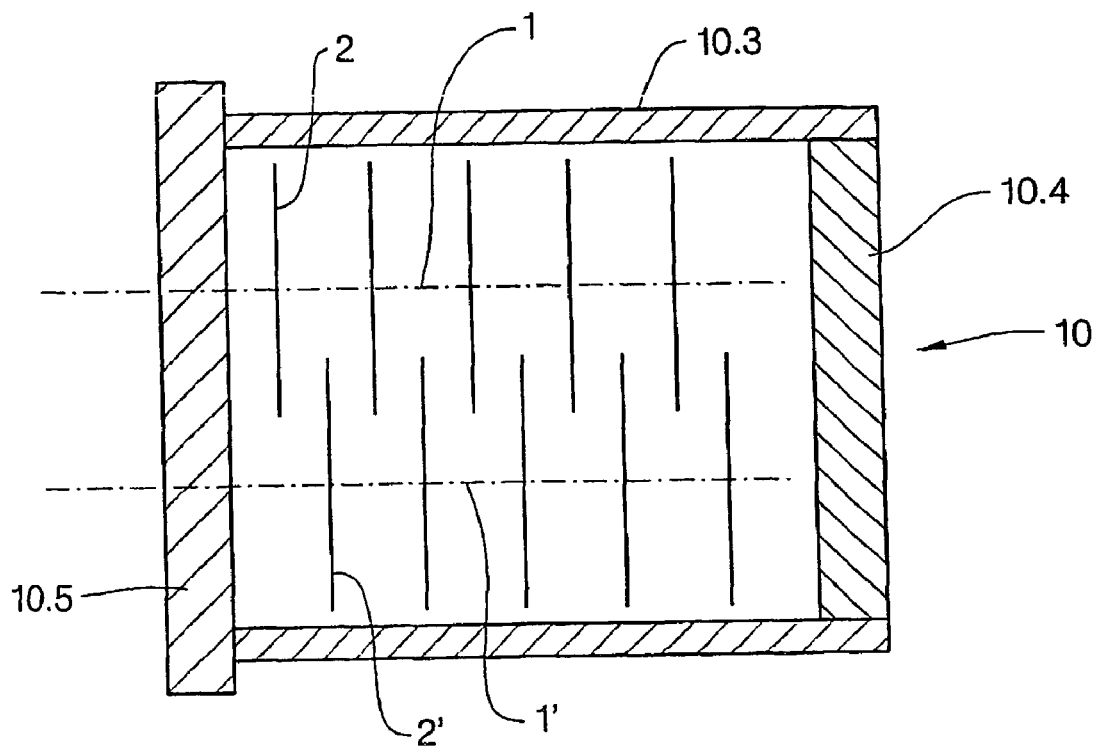
FIG. 8 shows in a diagrammatic view a device according to the invention; from this the details of the over-mounting are recognizable.

FIG. 8 further illustrates the invention. A first stack of disk-shaped bodies 2, which sit on a shaft 1, can be seen, as well as a second stack of disk-shaped bodies 2', which sit on a shaft 1'. The disks 2, 2' are in the present case ring-shaped disks. They could also have a different shape.

These two structural components, in each case containing shaft and disks, are located in a reservoir 10. The reservoir 10 includes a tubular, cylindrical casing 10.3, a base 10.4 as well as a lid 10.5. The reservoir does not have to be a regular cylinder. It can for example have the cross-section of a polygon. The reservoir does not even have to be cylindrical. It can be for example in the shape of a truncated cone.

The shafts 1, 1' are passed through the lid 10.5. They are mounted in the lid and sealed. The bearing and the seal are not represented here in detail.

On the exterior of the lid 10.5 are, likewise not represented, drive units for the two shafts 1, 1'.

It is important that the two shafts 1, 1' are over-mounted. They thus project freely out of the lid 10.5, without the need for a support of the two shafts 1, 1' at their other ends. In the present case thus a distance between the free ends of the shafts 1, 1' and the base 10.4 prevails.

Figure 9:
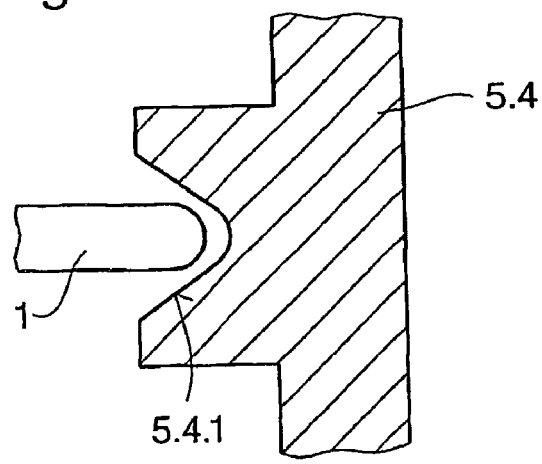
FIG. 9 shows a section of the subject of FIG. 8 in the area of the free end of a shaft.

FIG. 9 shows a modification of the subject of FIG. 8. The right end of the shaft 1 can be seen. A recess 5.4.1 is present in the base 5.4. The recess receives and centers the free end of the shaft 1.

Such a recess 5.4.1 can be suitable. However, it is not absolutely necessary. In each case no seal is required at the free end of the two shafts 1, 1'. Medium flows around the free shaft end during operation.

Particularly interesting design examples are represented in FIGS. 10 and 11. Two devices according to the invention are united with one another. All shafts run parallel to each other. The two reservoirs 10, 10' are joined. They include in each case a lid 10.5, 10.5' as well as a cylindrical, tubular casing 10.3, 10.3'. The casings 10.3, 10.3' carry in each case a ring flange 10.7, 10.7'. The two reservoirs are united with one another at this ring flange, for example by a mutual screw connection. This way the two reservoirs 10, 10' enclose only one area without partitioning. The casings 10.3, 10.3' can be also only one component, for example forming a continuous reservoir casing.

The design example according to FIG. 11 concerns again a twin version, which contains two reservoirs. The design is basically the same as in the design example according to FIG. 10. One difference is that instead of the two flanges 10.7, 10.7' a partition 10.8 is provided. This way two separate non-filtrate areas are created.

The whole device according to FIG. 11 is mounted on a rolling surface or a guide way 6. The two lids 10.5, 10.5' can be moved in axial direction for disassembly, together with the shafts and the disks located on the shafts, either with or without the reservoir casing. This way easy assembly and disassembly are possible.

The twin design according to FIGS. 10 and 11 has numerous benefits. First it is simpler in its design than two single devices. It contains in both cases the base, which in the design example according to FIG. 8 has to be present—see there base 10.4. In the case of the design example according to FIG. 10 the base is eliminated basically without a substitute—apart from the ring flanges 10.7, 10.7'. But also the ring flanges 10.7, 10.7' can be eliminated, for example if a only one continuous reservoir casing is intended. In the case of the design example according to FIG. 11 the two otherwise necessary bases are replaced by partition 10.8.

In the design example according to FIG. 11 the partition 10.8 can have passages. These passages are not represented here. Such passages can be standard bores. In addition, the openings can have an adjustable or regulated cross-section of the opening. From this result interesting possibilities for operating the device.

Figure 12:
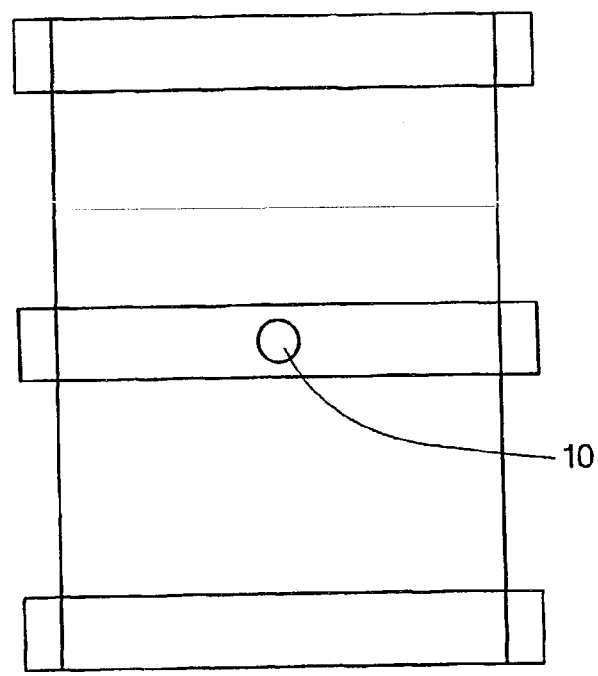
FIG. 12 shows the subject of FIG. 11 in a vertical position.
Figure 13:
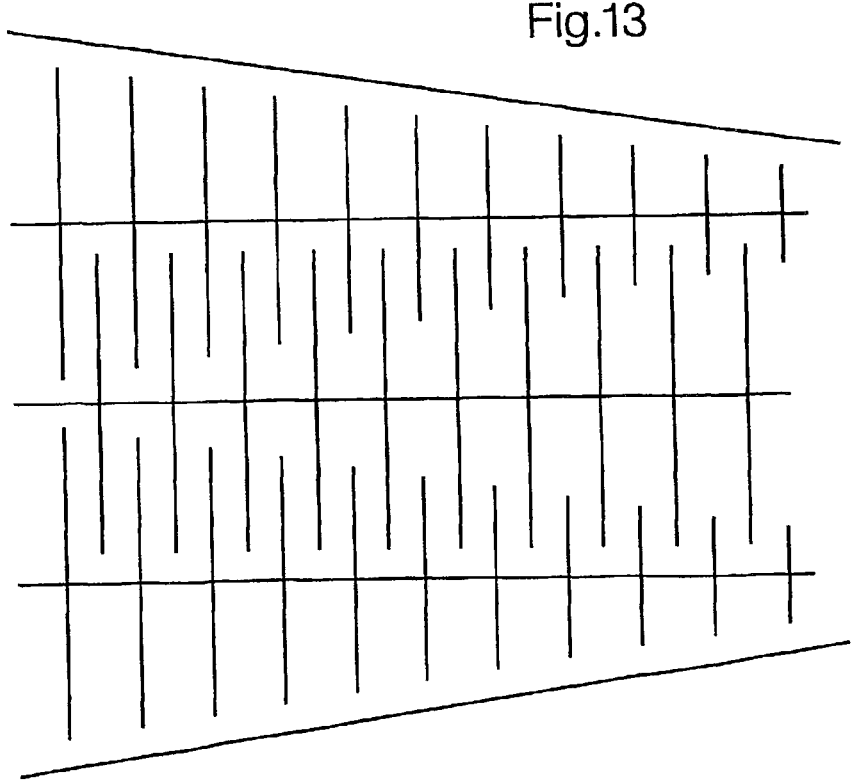
FIG. 13 shows in diagrammatic view a design example of a reservoir with conical casing.

FIG. 12 shows again a whole device similar to the one according to FIG. 11, united from two single devices. The whole device can be swiveled around a horizontal swiveling axis 10.9, so that the whole device can be swiveled from the vertical position represented here into a horizontal position. This can be very practical for the purpose of assembly and disassembly for example during maintenance work.

Figure 14:
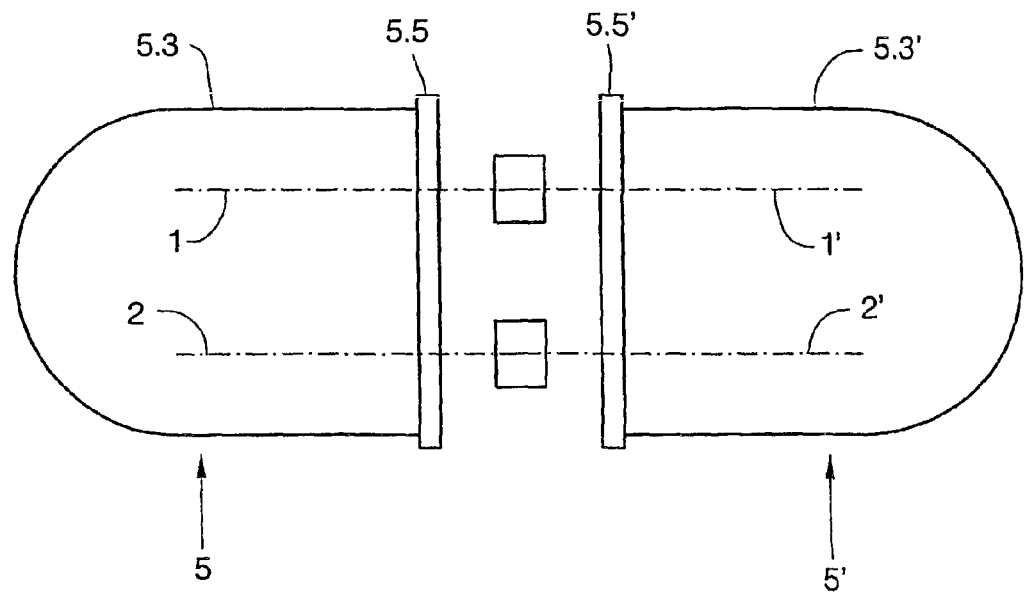
FIG. 14 shows a design example of a twin arrangement of two devices with shafts, which are mounted in each case in the center area of their length.

FIG. 14 shows again a design example of the device in twin arrangement with two single devices similar to the design examples according to FIGS. 10 and 11. Here are also two reservoirs that include lids 5.5, 5.5' as well as casings 5.3, 5.3'.

Contrary to the design examples according to FIGS. 10 and 11 however the lids 5.5, 5.5' are turned towards each other. Furthermore the shafts 1, 1', 2, 2' are mounted in the lids and face with their free ends outward, contrary to the design examples according to FIGS. 10 and 11, in which the free ends of the shafts are facing against each other.

The drive unit of the shafts is located between the two single devices.

Figure 15:
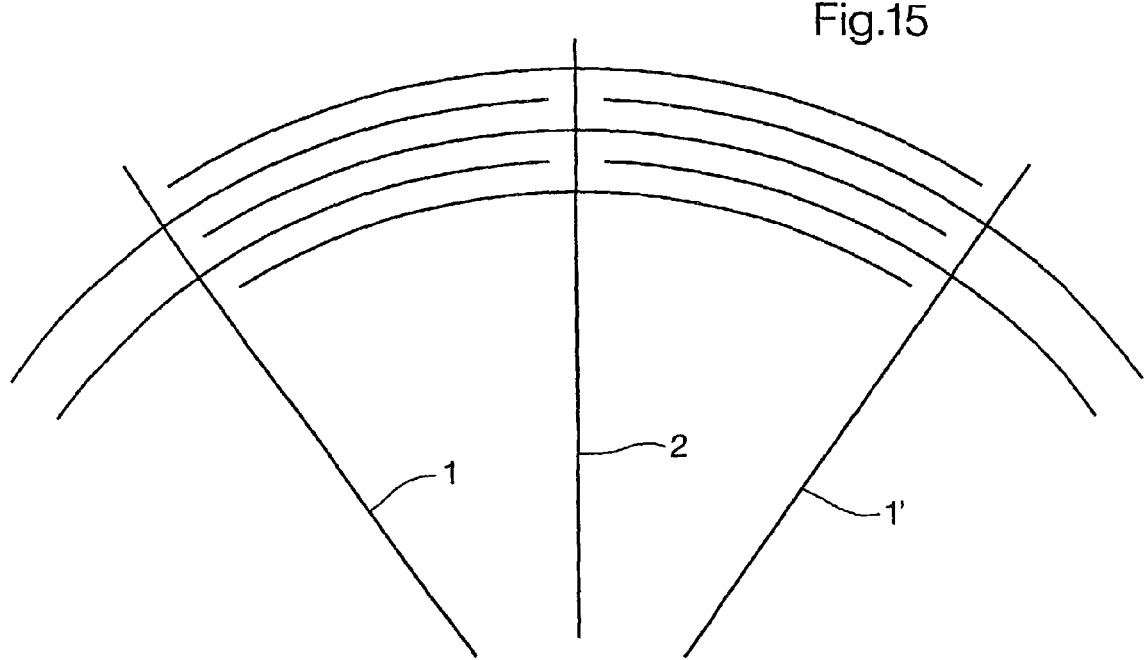
FIG. 15 shows in diagrammatic view a number of disk stacks with shafts inclined towards each other.

FIG. 15 shows a configuration of disk stacks in diagrammatic view, in which the three shafts 1, 2, 1' are inclined towards each other and the disks are plate-like shaped.

All devices according to the invention, shown here, can exhibit the following features:

The speeds of the stacks consisting of shafts and disks can be variable, adapted to the needs of the product. They range preferably in the speed range between 10 and 1000 rpm.

All stacks rotate in the same direction of rotation. The difference in speed between two plane elements opposite each other of two adjacent disks in within the overlap area, is relevant. This difference in speed can range between 1 and 20 m/s. The preferred range is between 2.5 and 7 m/s.

The disks can be classical filter disks, made from a porous ceramic material. But they can also be hollow strainer bodies. Finally at least some of the disks can be designed as so-called dummy disks. Likewise a composite-design is possible, for example unlimited random carrier and filter materials.

At least one of the shafts can have a connection for a washing liquid, in order to supply washing liquid through the shaft stack to the non-filtrate. In addition, the washing liquid can be supplied in other ways than through a shaft and/or the stack.

The disks of the individual disk stacks can be made from different filtering mediums, which are different from each other concerning their materials or their separating rates. This applies both within a chamber, as well as from one chamber to another.

For the processing of large volumes as well as for the realization of a continuous mode of operation several devices can be switched parallel to each other and/or into series.

Figure 16:
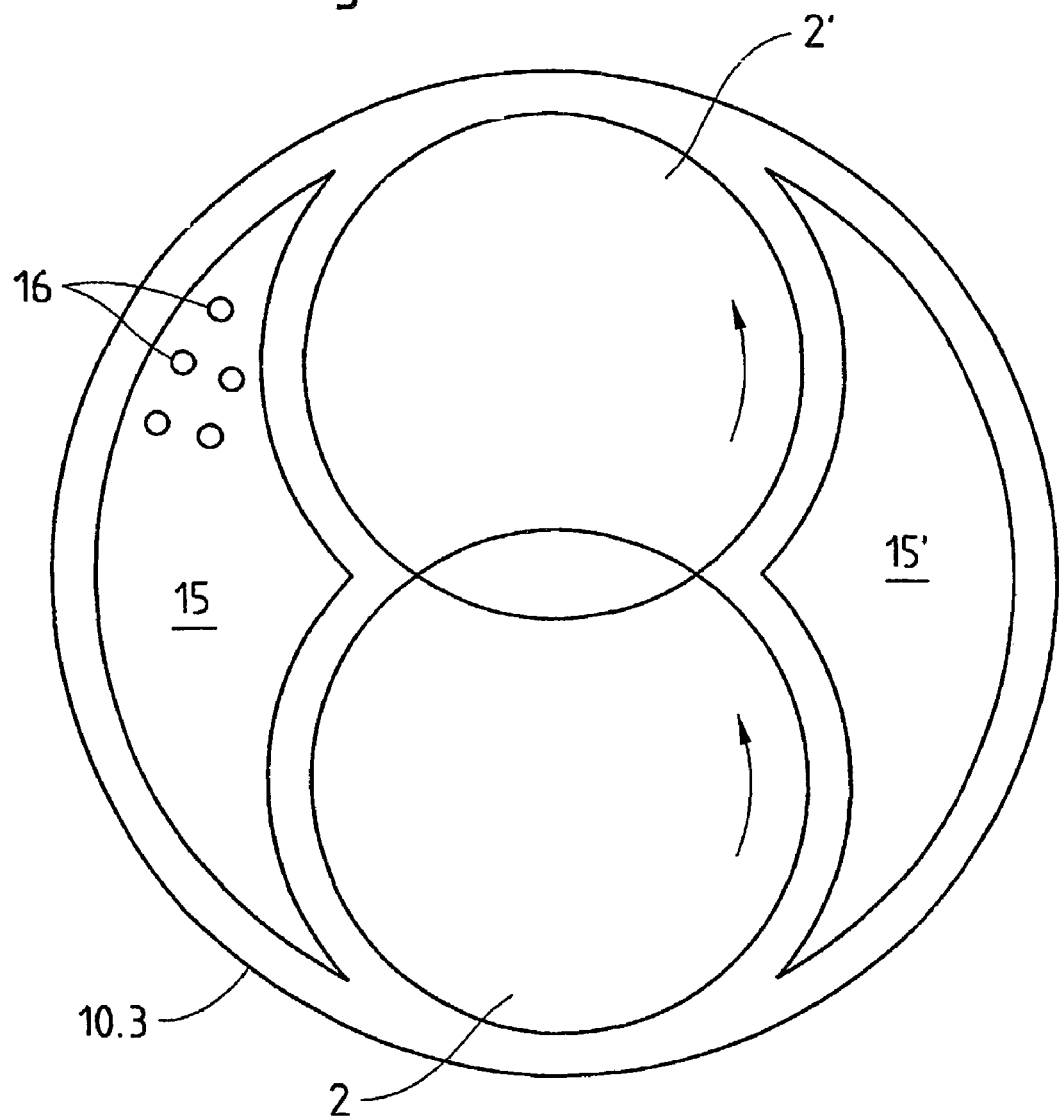
FIG. 16 shows in a cross-section perpendicular to the axis a device according to the invention in a special arrangement.

FIG. 16 shows a device in diagrammatic view in top view. A casing 10.3 of a reservoir can be seen here. The casing is circular. Therefore the reservoir is cylindrical shaped. The reservoir contains two disk stacks with disks 2.2'. The disks are again according to the invention arranged overlapping each other. The two arrows represent the directions of rotation.

The reservoir casing 10.3 forms together with the outer circumferences of the disk stacks two areas 15, 15', which look remotely similar to a sickle-shape. These two areas 15, 15' can be used very well for taking up auxiliary aggregates, particularly of cooling equipment, but also of heating equipment. See the schematically suggested condenser tubes 16, which run parallel to the longitudinal axis of the reservoir casing 10.3.

The inventors invented a particularly interesting method of operating the device. The device will be operated in such a manner that the disk stacks are during a certain time interval in standstill, then in rotation, then again in standstill, and so on. Thus the following is achieved:

During the standstill phases a static filtration takes place. A cake creates itself on the external surfaces of the disks. During the time intervals of rotation the cake is removed again.

This thought can be applied not only to the design of the device according to the invention, but also to a design deviating herefrom. Only the design of the disk stacks mentioned is necessary, in which the disks of one stack engage in the spaces between each other adjacent disks of the other stack. The rotation of the disks in the same direction is not necessary, but it is preferred.

The invention claimed is:

1. A device for filtering liquids, comprising:
   at least two shafts which are parallel to each other or at an acute angle to each other;
   each said shaft carrying a stack of filtering disks which extend perpendicularly to the shaft axis and which are connected to the shaft in a rotationally fixed manner;
   the disks of one disk stack engaged in the spaces between the disks of an adjacent disk stack;
   at least one of the shafts being drivable;
   at least one of the shafts being provided with bores;
   at least some of the disks carried by the shafts having internal channels therein, said channels being fluidly connected to the inside of their respective hollow shaft;
   wherein between each pair of adjacent disks of a shaft is a ring-shaped distancing element comprising a support ring and two sealing rings;
   each said sealing ring being located between the support ring and a disk neighboring the distancing element so that the distancing element is sealed against said neighboring disk;
   the support ring comprising a relatively hard, non-resilient material;
   said shafts and/or associated said support rings having projecting parts which cause centering of the support rings relative to the respective shafts;
   the shafts and/or support rings having grooves which create a rotationally fixed connection between the shafts and their respective support rings;
   each said support ring being over-dimensioned over the respective shaft to create a channel between the inner surface of the support ring and the outer surface of the shaft, said channel extending at least over a part of the length of the respective shaft.

2. A device according to claim 1 wherein the sealing rings comprise malleable or elastically deformable materials selected from the group consisting of elastomers, easily deformable metals, easily deformable metal alloys and graphite.

3. A device according to claim 2 wherein said sealing rings are affixed to said support ring by vulcanization.

4. A device according to claim 2 and including a seat to support an adjacent said disk against the sealing ring.

5. A device according to claim 1 wherein:
   two said sealing rings of a support ring are each on a surface of the respective support ring;
   the two sealing rings are connected by a bar in a single piece;
   the two sealing rings and bar of each spacer form a double T or U profile.

6. A device according to claim 1 characterized by materials for the shafts having the same longitudinal expansion rate for heat as the disks, support rings and sealing rings in their totality.

7. A device according to claim 1 wherein:
   assemblies of the combined shafts and disks are housed in a liquid-type container;
   the container includes a housing and a lid; and
   the shafts are cantilevered on one end in the container with a gasket against the container.

8. A device according to claim 7 characterized by the following features:
   two separate said containers are joined into a combined container where each said separate container contains one of the assemblies;
   the housings of the two separate containers are connected such that the lids of the two separate containers point in different directions;
   free ends of the shafts point towards each other.

9. A device according to claim 8 including a single, joint housing for the separate containers.

10. A device according to claim 7 characterized by the following features:
- two separate said containers are joined into a combined container where each separate container contains one of the assemblies;
- the housings of the two separate containers are joined along a common separating wall;
- the shafts in the two separate containers are supported only in a central area of the separating wall and gasket-free ends of the shafts point at opposite directions.

11. A device according to claim 10 wherein the two separate containers enclose a single and undivided space.

12. A device according to claim 10 and including holes in the separating wall to allow for free flow between the two spaces enclosed by the separate containers.

13. A device according to claim 7 and having a pivoting unit on the container such that that container can be pivoted from a vertical to a horizontal position.

14. A device according to claim 7 wherein the housing is cylindrical.

15. A device according to claim 7 wherein the housing is non-cylindrical.

16. A device according to claim 15 wherein the housing is cone-shaped.

17. A device according to claim 15 wherein the housing has a semi-circular cross-section viewed perpendicularly to its axis.

18. A device according to claim 7 wherein the housing has a shape that matches the shape of the disk stacks.

19. A device according to claim 7 wherein the exteriors of the stacks do not have round cylindrical shapes.

20. A device according to claim 19 wherein the exteriors of the stacks are a cone shape.

21. A device according to claim 7 wherein the shafts of the stacks incline toward each other.

22. A device according to claim 21 wherein the disks are not straight and have a spherical or plate-like shape.

23. A device according to claim 7 wherein:
- the container has the shape of a round cylinder;
- the space between the interior surface of the housing of the container and the exterior surfaces of adjacent disk stacks contains heat exchanger inserts to heat or cool the product to be processed.

* * * * *